June 20, 1950      J. C. FENNELL      2,512,202
BEAR CLAW CUTTER
Filed April 8, 1947
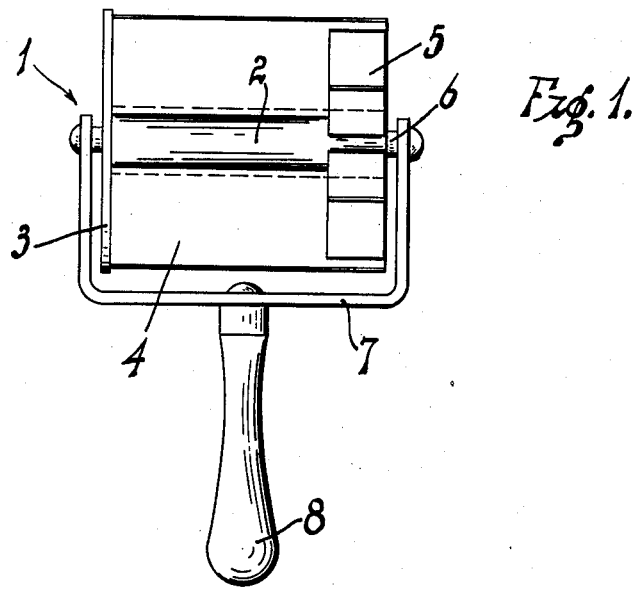
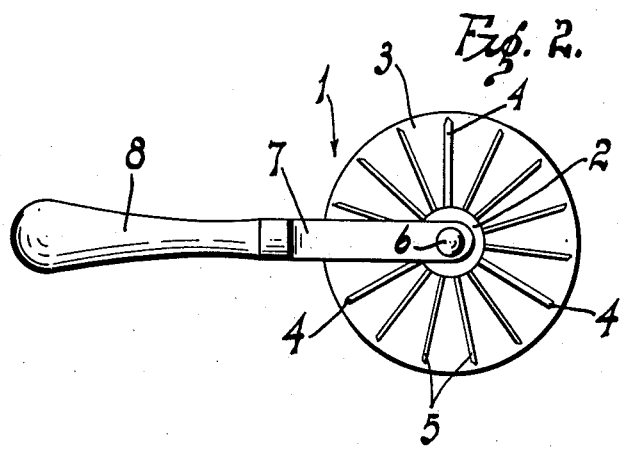
Inventor
James C. Fennell.
By H. A. Dickman
Attorney Patented June 20, 1950

2,512,202

UNITED STATES PATENT OFFICE 2,512,202

BEAR CLAW CUTTER

James C. Fennell, Redondo Beach, Calif.

Application April 8, 1947, Serial No. 740,209

3 Claims. (Cl. 30—306)

This invention relates to a dough cutter particularly for certain type of confections known as bear claws. These confections are a filled cake dough which is cut in rectangular pieces, the folded ends being pressed together and cut with short incisions, thus binding the folded edges of the dough together.

An object of my invention is to provide a bear claw cutter which is rolled over the filled strip of dough, cutting the dough at intervals into separate rectangular pieces and simultaneously making short cuts or incisions along the folded edge of the dough.

Another object of my invention is to provide a dough cutter of the character stated which is simple in construction, inexpensive to manufacture and effective in use.

A feature of my invention is to provide a cutter in which the cutter assembly is supported at one end by a disk and at the other end by the short cutters, thus providing an assembly which operates similar to a wheel.

Other objects, advantages and features of invention may appear from the accompanying drawing, the subjoined detailed description and the appended claims.

In the drawing:

Figure 1 is a top plan view of my cutter.

Figure 2 is an end view of the same.

Referring more particularly to the drawing, my dough cutter 1 comprises a central hub 2 on one end of which a disk or wheel 3 is formed, this disk may be integral with the hub 2. A plurality of main cutter blades 4 extend radially from the hub 2 and also substantially the entire length of this hub. They terminate in the disk 3 at one end while the other ends are in alignment with the auxiliary cutters as will be further described.

Between the cutters 4, I provide a plurality of short auxiliary cutters 5 which extend radially from the hub 2 and are relatively narrow. These blades cut short incisions in the outer end of the confection for the purpose of sealing the folded end of the dough. A spindle or shaft 6 extends through the hub 2 and a frame 7 is journalled on this spindle. A handle 8 is attached to the frame 7 for the purpose of operating the cutter.

In operation, it will be evident that one end of the cutter assembly is supported by the disk 3 while the other end is supported by the outer or cutting edges of the main cutters 4, and the auxiliary cutters 5 act somewhat as a wheel. The outer cutting edges of the blades 4 and 5 lie on substantially the same circumference.

Having described my invention, I claim:

1. A dough cutter comprising a hub, a disk on one end of said hub, a plurality of spaced main cutter blades extending radially from the hub and substantially the length thereof, and a plurality of auxiliary cutting blades extending radially from the hub, said auxiliary blades being materially shorter in length than the main blades, and positioned on the end of the hub opposite the disk.

2. A dough cutter comprising a hub, a disk on one end of said hub, a plurality of spaced main cutter blades extending radially from the hub and substantially the length thereof, and a plurality of auxiliary cutting blades extending radially from the hub, said auxiliary blades being materially shorter in length than the main blades, and positioned on the end of the hub opposite the disk, a frame, said hub being rotatably mounted in the frame, and a handle on the frame.

3. A dough cutter comprising a hub, a disk on one end of said hub, a spindle extending from the hub, a frame, said spindle being journalled in the frame, a handle on the frame, a plurality of main cutter blades extending radially from the hub, and substantially the length thereof, a plurality of auxiliary cutter blades extending radially from the hub and positioned between the main cutter blades, said auxiliary cutter blades being shorter in length than the main cutter blades, and positioned on the end of the hub opposite the disk, the outer edges of the auxiliary cutter blades and the main cutter blades lying substantially on the same circumference.

JAMES C. FENNELL.

REFERENCES CITED

The following references are of record in the file of this patent:

UNITED STATES PATENTS

| Number | Name | Date |
|---|---|---|
| 845,367 | Miller | Feb. 26, 1907 |
| 1,098,747 | Meyer | June 2, 1914 |